United States Patent
Huntington et al.

(10) Patent No.: US 9,752,458 B2
(45) Date of Patent: Sep. 5, 2017

(54) SYSTEM AND METHOD FOR A GAS TURBINE ENGINE

(71) Applicants: General Electric Company, Schenectady, NY (US); ExxonMobil Upstream Research Company, Houston, TX (US)

(72) Inventors: Richard A. Huntington, Houston, TX (US); Sulabh K. Dhanuka, Houston, TX (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 232 days.

(21) Appl. No.: 14/553,458

(22) Filed: Nov. 25, 2014

(65) Prior Publication Data
US 2015/0308293 A1 Oct. 29, 2015

Related U.S. Application Data

(60) Provisional application No. 61/911,912, filed on Dec. 4, 2013.

(51) Int. Cl.
| | |
|---|---|
| *F01D 1/00* | (2006.01) |
| *F01D 25/30* | (2006.01) |
| *F02C 3/34* | (2006.01) |
| *F02C 6/18* | (2006.01) |
| *F02C 9/28* | (2006.01) |
| *F02C 6/00* | (2006.01) |

(52) U.S. Cl.
CPC ............... *F01D 25/30* (2013.01); *F02C 3/34* (2013.01); *F02C 6/00* (2013.01); *F02C 6/18* (2013.01);

(Continued)

(58) Field of Classification Search
None
See application file for complete search history.

(56) References Cited

U.S. PATENT DOCUMENTS

| | | | |
|---|---|---|---|
| 2,488,911 A | 11/1949 | Hepburn et al. | |
| 2,884,758 A | 5/1959 | Oberle | |

(Continued)

FOREIGN PATENT DOCUMENTS

| | | |
|---|---|---|
| CA | 2231749 | 9/1998 |
| CA | 2645450 | 9/2007 |

(Continued)

OTHER PUBLICATIONS

PCT ISR & WO Mailed Mar. 18, 2015.

(Continued)

*Primary Examiner* — Pascal M Bui Pho
*Assistant Examiner* — Katheryn Malatek
(74) *Attorney, Agent, or Firm* — Fletcher Yoder P.C.

(57) ABSTRACT

A system includes a gas turbine engine configured to combust an oxidant and a fuel to generate an exhaust gas, a catalyst bed configured to treat a portion of the exhaust gas from the gas turbine engine to generate a treated exhaust gas, a differential temperature monitor configured to monitor a differential temperature between a first temperature of the portion of exhaust gas upstream of the catalyst bed and a second temperature of the treated exhaust gas downstream of the catalyst bed, and an oxidant-to-fuel ratio system configured to adjust a parameter to maintain an efficacy of the catalyst bed based at least in part on the differential temperature in order to maintain a target equivalence ratio.

19 Claims, 8 Drawing Sheets

(52) U.S. Cl.
CPC ............ *F02C 9/28* (2013.01); *F05D 2220/32* (2013.01); *F05D 2270/08* (2013.01); *F05D 2270/303* (2013.01); *Y02E 20/16* (2013.01); *Y02T 50/677* (2013.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |

(56) References Cited

U.S. PATENT DOCUMENTS

| | | |
|---|---|---|
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |

(56) References Cited

U.S. PATENT DOCUMENTS

| | | | |
|---|---|---|---|
| 7,137,623 | B2 | 11/2006 | Mockry et al. |
| 7,143,572 | B2 | 12/2006 | Ooka et al. |
| 7,143,606 | B2 | 12/2006 | Tranier |
| 7,146,969 | B2 | 12/2006 | Weirich |
| 7,147,461 | B2 | 12/2006 | Neary |
| 7,148,261 | B2 | 12/2006 | Hershkowitz et al. |
| 7,152,409 | B2 | 12/2006 | Yee et al. |
| 7,162,875 | B2 | 1/2007 | Fletcher et al. |
| 7,168,265 | B2 | 1/2007 | Briscoe et al. |
| 7,168,488 | B2 | 1/2007 | Olsvik et al. |
| 7,183,328 | B2 | 2/2007 | Hershkowitz et al. |
| 7,185,497 | B2 | 3/2007 | Dudebout et al. |
| 7,194,869 | B2 | 3/2007 | McQuiggan et al. |
| 7,197,880 | B2 | 4/2007 | Thornton et al. |
| 7,217,303 | B2 | 5/2007 | Hershkowitz et al. |
| 7,225,623 | B2 | 6/2007 | Koshoffer |
| 7,237,385 | B2 | 7/2007 | Carrea |
| 7,284,362 | B2 | 10/2007 | Marin et al. |
| 7,299,619 | B2 | 11/2007 | Briesch et al. |
| 7,299,868 | B2 | 11/2007 | Zapadinski |
| 7,302,801 | B2 | 12/2007 | Chen |
| 7,305,817 | B2 | 12/2007 | Blodgett et al. |
| 7,305,831 | B2 | 12/2007 | Carrea et al. |
| 7,313,916 | B2 | 1/2008 | Pellizzari |
| 7,318,317 | B2 | 1/2008 | Carrea |
| 7,343,742 | B2 | 3/2008 | Wimmer et al. |
| 7,353,655 | B2 | 4/2008 | Bolis et al. |
| 7,357,857 | B2 | 4/2008 | Hart et al. |
| 7,363,756 | B2 | 4/2008 | Carrea et al. |
| 7,363,764 | B2 | 4/2008 | Griffin et al. |
| 7,381,393 | B2 | 6/2008 | Lynn |
| 7,401,577 | B2 | 7/2008 | Saucedo et al. |
| 7,410,525 | B1 | 8/2008 | Liu et al. |
| 7,416,137 | B2 | 8/2008 | Hagen et al. |
| 7,434,384 | B2 | 10/2008 | Lord et al. |
| 7,438,744 | B2 | 10/2008 | Beaumont |
| 7,467,942 | B2 | 12/2008 | Carroni et al. |
| 7,468,173 | B2 | 12/2008 | Hughes et al. |
| 7,472,550 | B2 | 1/2009 | Lear et al. |
| 7,481,048 | B2 | 1/2009 | Harmon et al. |
| 7,481,275 | B2 | 1/2009 | Olsvik et al. |
| 7,482,500 | B2 | 1/2009 | Johann et al. |
| 7,485,761 | B2 | 2/2009 | Schindler et al. |
| 7,488,857 | B2 | 2/2009 | Johann et al. |
| 7,490,472 | B2 | 2/2009 | Lynghjem et al. |
| 7,491,250 | B2 | 2/2009 | Hershkowitz et al. |
| 7,492,054 | B2 | 2/2009 | Catlin |
| 7,493,769 | B2 | 2/2009 | Jangili |
| 7,498,009 | B2 | 3/2009 | Leach et al. |
| 7,503,178 | B2 | 3/2009 | Bucker et al. |
| 7,503,948 | B2 | 3/2009 | Hershkowitz et al. |
| 7,506,501 | B2 | 3/2009 | Anderson et al. |
| 7,513,099 | B2 | 4/2009 | Nuding et al. |
| 7,513,100 | B2 | 4/2009 | Motter et al. |
| 7,516,626 | B2 | 4/2009 | Brox et al. |
| 7,520,134 | B2 | 4/2009 | Durbin et al. |
| 7,523,603 | B2 | 4/2009 | Hagen et al. |
| 7,536,252 | B1 | 5/2009 | Hibshman et al. |
| 7,536,873 | B2 | 5/2009 | Nohlen |
| 7,540,150 | B2 | 6/2009 | Schmid et al. |
| 7,559,977 | B2 | 7/2009 | Fleischer et al. |
| 7,562,519 | B1 | 7/2009 | Harris et al. |
| 7,562,529 | B2 | 7/2009 | Kuspert et al. |
| 7,566,394 | B2 | 7/2009 | Koseoglu |
| 7,574,856 | B2 | 8/2009 | Mak |
| 7,591,866 | B2 | 9/2009 | Bose |
| 7,594,386 | B2 | 9/2009 | Narayanan et al. |
| 7,610,752 | B2 | 11/2009 | Betta et al. |
| 7,610,759 | B2 | 11/2009 | Yoshida et al. |
| 7,611,681 | B2 | 11/2009 | Kaefer |
| 7,614,352 | B2 | 11/2009 | Anthony et al. |
| 7,618,606 | B2 | 11/2009 | Fan et al. |
| 7,631,493 | B2 | 12/2009 | Shirakawa et al. |
| 7,634,915 | B2 | 12/2009 | Hoffmann et al. |
| 7,635,408 | B2 | 12/2009 | Mak et al. |
| 7,637,093 | B2 | 12/2009 | Rao |
| 7,644,573 | B2 | 1/2010 | Smith et al. |
| 7,650,744 | B2 | 1/2010 | Varatharajan et al. |
| 7,654,320 | B2 | 2/2010 | Payton |
| 7,654,330 | B2 | 2/2010 | Zubrin et al. |
| 7,655,071 | B2 | 2/2010 | De Vreede |
| 7,670,135 | B1 | 3/2010 | Zink et al. |
| 7,673,454 | B2 | 3/2010 | Saito et al. |
| 7,673,685 | B2 | 3/2010 | Shaw et al. |
| 7,674,443 | B1 | 3/2010 | Davis |
| 7,677,309 | B2 | 3/2010 | Shaw et al. |
| 7,681,394 | B2 | 3/2010 | Haugen |
| 7,682,597 | B2 | 3/2010 | Blumenfeld et al. |
| 7,690,204 | B2 | 4/2010 | Drnevich et al. |
| 7,691,788 | B2 | 4/2010 | Tan et al. |
| 7,695,703 | B2 | 4/2010 | Sobolevskiy et al. |
| 7,717,173 | B2 | 5/2010 | Grott |
| 7,721,543 | B2 | 5/2010 | Massey et al. |
| 7,726,114 | B2 | 6/2010 | Evulet |
| 7,734,408 | B2 | 6/2010 | Shiraki |
| 7,739,864 | B2 | 6/2010 | Finkenrath et al. |
| 7,749,311 | B2 | 7/2010 | Saito et al. |
| 7,752,848 | B2 | 7/2010 | Balan et al. |
| 7,752,850 | B2 | 7/2010 | Laster et al. |
| 7,753,039 | B2 | 7/2010 | Harima et al. |
| 7,753,972 | B2 | 7/2010 | Zubrin et al. |
| 7,762,084 | B2 | 7/2010 | Martis et al. |
| 7,763,163 | B2 | 7/2010 | Koseoglu |
| 7,763,227 | B2 | 7/2010 | Wang |
| 7,765,810 | B2 | 8/2010 | Pfefferle |
| 7,788,897 | B2 | 9/2010 | Campbell et al. |
| 7,789,159 | B1 | 9/2010 | Bader |
| 7,789,658 | B2 | 9/2010 | Towler et al. |
| 7,789,944 | B2 | 9/2010 | Saito et al. |
| 7,793,494 | B2 | 9/2010 | Wirth et al. |
| 7,802,434 | B2 | 9/2010 | Varatharajan et al. |
| 7,815,873 | B2 | 10/2010 | Sankaranarayanan et al. |
| 7,815,892 | B2 | 10/2010 | Hershkowitz et al. |
| 7,819,951 | B2 | 10/2010 | White et al. |
| 7,824,179 | B2 | 11/2010 | Hasegawa et al. |
| 7,827,778 | B2 | 11/2010 | Finkenrath et al. |
| 7,827,794 | B1 | 11/2010 | Pronske et al. |
| 7,841,186 | B2 | 11/2010 | So et al. |
| 7,845,406 | B2 | 12/2010 | Nitschke |
| 7,846,401 | B2 | 12/2010 | Hershkowitz et al. |
| 7,861,511 | B2 | 1/2011 | Chillar et al. |
| 7,874,140 | B2 | 1/2011 | Fan et al. |
| 7,874,350 | B2 | 1/2011 | Pfefferle |
| 7,875,402 | B2 | 1/2011 | Hershkowitz et al. |
| 7,882,692 | B2 | 2/2011 | Pronske et al. |
| 7,886,522 | B2 | 2/2011 | Kammel |
| 7,886,523 | B1 * | 2/2011 | Legare ............ F02D 41/008 60/274 |
| 7,895,822 | B2 | 3/2011 | Hoffmann et al. |
| 7,896,105 | B2 | 3/2011 | Dupriest |
| 7,906,304 | B2 | 3/2011 | Kohr |
| 7,909,898 | B2 | 3/2011 | White et al. |
| 7,914,749 | B2 | 3/2011 | Carstens et al. |
| 7,914,764 | B2 | 3/2011 | Hershkowitz et al. |
| 7,918,906 | B2 | 4/2011 | Zubrin et al. |
| 7,921,633 | B2 | 4/2011 | Rising |
| 7,922,871 | B2 | 4/2011 | Price et al. |
| 7,926,292 | B2 | 4/2011 | Rabovitser et al. |
| 7,931,712 | B2 | 4/2011 | Zubrin et al. |
| 7,931,731 | B2 | 4/2011 | Van Heeringen et al. |
| 7,931,888 | B2 | 4/2011 | Drnevich et al. |
| 7,934,926 | B2 | 5/2011 | Kornbluth et al. |
| 7,942,003 | B2 | 5/2011 | Baudoin et al. |
| 7,942,008 | B2 | 5/2011 | Joshi et al. |
| 7,943,097 | B2 | 5/2011 | Golden et al. |
| 7,955,403 | B2 | 6/2011 | Ariyapadi et al. |
| 7,966,822 | B2 | 6/2011 | Myers et al. |
| 7,976,803 | B2 | 7/2011 | Hooper et al. |
| 7,980,312 | B1 | 7/2011 | Hill et al. |
| 7,985,399 | B2 | 7/2011 | Drnevich et al. |
| 7,988,750 | B2 | 8/2011 | Lee et al. |
| 8,001,789 | B2 | 8/2011 | Vega et al. |
| 8,029,273 | B2 | 10/2011 | Paschereit et al. |
| 8,036,813 | B2 | 10/2011 | Tonetti et al. |

(56) References Cited

U.S. PATENT DOCUMENTS

| | | |
|---|---|---|
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0260349 A1* | 10/2009 | Gandhi .............. B01D 53/9418 60/286 |

(56) References Cited

U.S. PATENT DOCUMENTS

| | | |
|---|---|---|
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0073260 A1 | 3/2012 | Draper |
| 2012/0085100 A1 | 4/2012 | Hughes et al. |
| 2012/0096870 A1 | 4/2012 | Wichmann et al. |
| 2012/0119ledgement A1 | 5/2012 | Draper |
| 2012/0131925 A1 | 5/2012 | Mittricker et al. |
| 2012/0144837 A1* | 6/2012 | Rasmussen ............... C01B 3/384 60/772 |
| 2012/0185144 A1* | 7/2012 | Draper .................... F01K 13/02 701/100 |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0025254 A1* | 1/2013 | Kurosaka ............... F02C 3/205 60/39.24 |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0150445 A1 | 6/2014 | Huntington et al. |
| 2014/0182298 A1 | 7/2014 | Krull et al. |
| 2014/0182299 A1 | 7/2014 | Woodall et al. |
| 2014/0182301 A1 | 7/2014 | Fadde et al. |
| 2014/0182302 A1 | 7/2014 | Antoniono et al. |
| 2014/0182303 A1 | 7/2014 | Antoniono et al. |
| 2014/0182304 A1 | 7/2014 | Antoniono et al. |
| 2014/0182305 A1 | 7/2014 | Antoniono et al. |
| 2014/0196464 A1 | 7/2014 | Biyani et al. |
| 2014/0216011 A1 | 8/2014 | Muthaiah et al. |
| 2015/0000292 A1 | 1/2015 | Subramaniyan |
| 2015/0000293 A1 | 1/2015 | Thatcher et al. |
| 2015/0000294 A1 | 1/2015 | Minto et al. |
| 2015/0000299 A1 | 1/2015 | Zuo et al. |
| 2015/0033748 A1 | 2/2015 | Vaezi |
| 2015/0033749 A1 | 2/2015 | Slobodyanskiy et al. |
| 2015/0033751 A1 | 2/2015 | Andrew |
| 2015/0033757 A1 | 2/2015 | White et al. |
| 2015/0040574 A1 | 2/2015 | Wichmann et al. |
| 2015/0059350 A1 | 3/2015 | Kolvick et al. |
| 2015/0075171 A1 | 3/2015 | Sokolov et al. |
| 2015/0152791 A1 | 6/2015 | White |
| 2015/0198089 A1 | 7/2015 | Muthaiah et al. |
| 2015/0204239 A1 | 7/2015 | Minto et al. |
| 2015/0214879 A1 | 7/2015 | Huntington et al. |
| 2015/0226133 A1 | 8/2015 | Minto et al. |

FOREIGN PATENT DOCUMENTS

| | | |
|---|---|---|
| CN | 101559325 A | 10/2009 |
| CN | 102563592 A | 7/2012 |
| CN | 102588113 A | 7/2012 |
| EP | 0770771 | 5/1997 |
| EP | 2535643 A2 | 12/2012 |
| GB | 0776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |
| WO | WO2014133406 | 9/2014 |

OTHER PUBLICATIONS

U.S. Appl. No. 14/771,450, filed Feb. 28, 2013, Valeev et al.
U.S. Appl. No. 14/067,552, filed Sep. 9, 2014, Huntington et al.
U.S. Appl. No. 14/553,458, filed Nov. 25, 2014, Huntington et al.
U.S. Appl. No. 14/599,750, filed Jan. 19, 2015, O'Dea et al.
U.S. Appl. No. 14/712,723, filed May 14, 2015, Manchikanti et al.
U.S. Appl. No. 14/726,001, filed May 29, 2015, Della-Fera et al.

(56) References Cited

OTHER PUBLICATIONS

U.S. Appl. No. 14/741,189, filed Jun. 16, 2015, Minto et al.
U.S. Appl. No. 14/745,095, filed Jun. 19, 2015, Minto et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), , San Antonio, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown, WV; NASA Glenn Research Center (US), 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
Chinese Office Action for CN Application No. 201480074857.6 dated May 4, 2017; 32 pgs.

* cited by examiner

SYSTEM AND METHOD FOR A GAS TURBINE ENGINE

CROSS-REFERENCE TO RELATED APPLICATIONS

This application claims priority to and benefit of U.S. Provisional Patent Application No. 61/911,912, entitled "SYSTEM AND METHOD FOR A GAS TURBINE ENGINE," filed Dec. 4, 2013, which is hereby incorporated by reference in its entirety for all purposes.

BACKGROUND

The subject matter disclosed herein relates to gas turbine engines, and more specifically, to systems and methods for operating gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. In turn, the turbine section drives one or more compressor stages of a compressor section. Again, the fuel and oxidant mix in the combustor section, and then combust to produce the hot combustion products. Under certain conditions, it may be useful to use feedback control to operate the gas turbine engine to achieve a desired composition of the hot combustion products. Furthermore, gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine configured to combust an oxidant and a fuel to generate an exhaust gas, a catalyst bed configured to treat a portion of the exhaust gas from the gas turbine engine to generate a treated exhaust gas, a differential temperature monitor configured to monitor a differential temperature between a first temperature of the portion of exhaust gas upstream of the catalyst bed and a second temperature of the treated exhaust gas downstream of the catalyst bed, and an oxidant-to-fuel ratio system configured to adjust a parameter to maintain an efficacy of the catalyst bed based at least in part on the differential temperature in order to maintain a target equivalence ratio.

In a second embodiment, a method includes combusting an oxidant and a fuel in a gas turbine engine to generate an exhaust gas, treating portion of the exhaust gas from the gas turbine engine in a catalyst bed to generate a treated exhaust gas, monitoring a differential temperature between a first temperature of the portion of exhaust gas upstream of the catalyst bed and a second temperature of the treated exhaust gas downstream of the catalyst bed using a differential temperature monitor, and adjusting a parameter to maintain an efficacy of the catalyst bed based at least in part on the differential temperature in order to maintain a target equivalence ratio using an oxidant-to-fuel ratio system.

In a third embodiment, a system includes a controller that includes one or more tangible, non-transitory, machine-readable media collectively storing one or more sets of instructions and one or more processing devices configured to execute the one or more sets of instructions to combust an oxidant and a fuel in a gas turbine engine to generate an exhaust gas, treat a portion of the exhaust gas from the gas turbine engine in a catalyst bed to generate a treated exhaust gas, monitor a differential temperature between an inlet temperature of the exhaust gas upstream of the catalyst bed and an outlet temperature of the treated exhaust gas downstream of the catalyst bed using a differential temperature monitor, transmit a differential temperature signal from the differential temperature monitor to a control system, and adjust a parameter to maintain an efficacy of the catalyst bed based at least in part on the differential temperature in order to maintain a target equivalence ratio.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
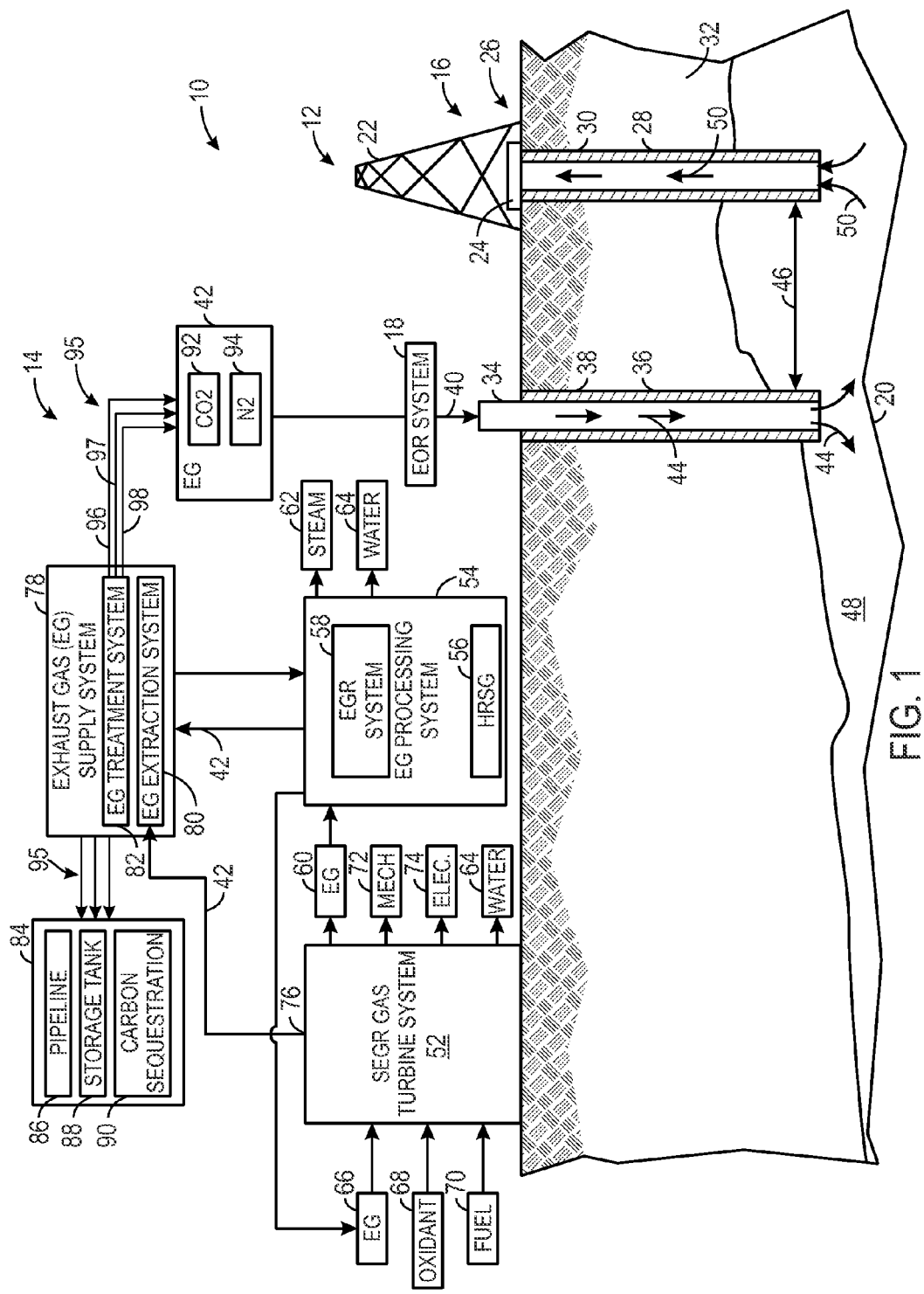
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames (e.g., using diffusion fuel nozzles), premix flames (e.g., using premix fuel nozzles), or any combination thereof. In certain embodiments, the diffusion flames may help to maintain stability and operation within certain limits for stoichiometric combustion, which in turn helps to increase production of $CO_2$. For example, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

The disclosed embodiments provide systems and methods for an oxidant-to-fuel ratio system used with a gas turbine engine with EGR. Specifically, a system may include the gas turbine engine and a catalyst bed configured to treat the exhaust gas from the gas turbine engine to generate a treated exhaust gas. In addition, the system may include a differential temperature monitor configured to monitor a differential temperature between an inlet temperature of the exhaust gas and an outlet temperature of the treated exhaust gas. Further, the system may include an oxidant-to-fuel ratio system configured to adjust at least one of an oxidant flow rate of the oxidant, or a fuel flow rate of the fuel, or any combination thereof, based at least in part on the differential temperature. For example, the catalyst bed may be used to decrease a concentration of carbon monoxide, oxygen, hydrogen, nitrogen oxides, and/or unburned hydrocarbons of the exhaust gas. By reducing the concentration of such gases in the exhaust gas using the catalyst bed, the exhaust gas may be more useful for certain applications, such as enhanced oil recovery. In addition, the venting of exhaust gas with higher concentration of such gases to the atmosphere may be regulated.

By adjusting at least one of the oxidant flow rate, the fuel flow rate, or any combination thereof, based at least in part on the differential temperature across the catalyst bed, improved operation of the gas turbine engine may be achieved. For example, the oxidant-to-fuel ratio system may be used to operate the gas turbine engine as a stoichiometric exhaust gas recirculation (SEGR) gas turbine engine. As described in detail below, the oxidant-to-fuel ratio system may be used to operate the SEGR gas turbine engine within a certain range of equivalence ratio values, where the equivalence ratio for the gas turbine engine is defined as the ratio between the actual fuel-to-oxidant ratio to the stoichiometric fuel-to-oxidant ratio or the ratio between the stoichiometric oxidant-to-fuel ratio to the actual oxidant-to-fuel ratio. The differential temperature across the catalyst bed, as monitored by the differential temperature monitor, may provide an indication of the equivalence ratio at which the SEGR gas turbine engine is operating. Thus, by using feedback control, the differential temperature across the catalyst bed may be used to adjust operation of the SEGR gas turbine engine to maintain operation within a desired range of equivalence ratio values. For example, if the differential temperature across the catalyst bed indicates that operation of the SEGR gas turbine engine is outside the range of desired equivalence ratio values, the oxidant-to-fuel ratio system may be used to adjust at least one of the oxidant flow rate, or the fuel flow rate, or any combustion thereof, to achieve the desired equivalence ratio. The differential temperature across the catalyst bed may enable the oxidant-to-fuel ratio system to adjust the SEGR gas turbine engine to achieve the desired equivalence ratio faster and/or more accurately than other indications of the equivalence ratio.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
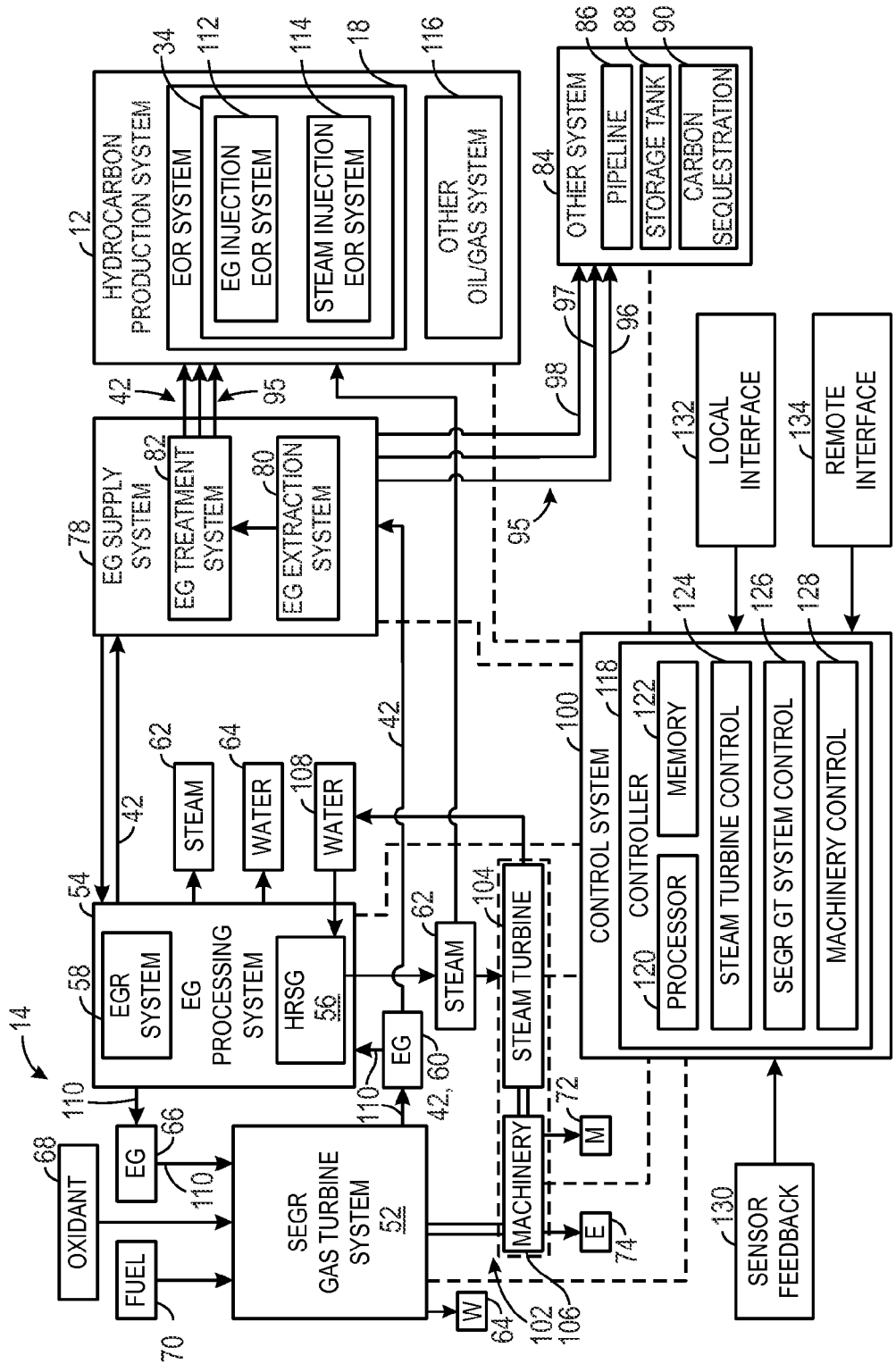
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The memory 122 may include one or more tangible, non-transitory, machine-readable media collectively storing one or more sets of instructions. The controls 124, 126, and 128 may include software and/or hardware controls. For example, the controls 124, 126, and 128 may include various instructions or code stored on the memory 122 and executable by the processor 120, which may be configured to execute the one or more sets of instructions stored on the memory 122. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_x$) within a target range of less than approximately 25, 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 25, 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
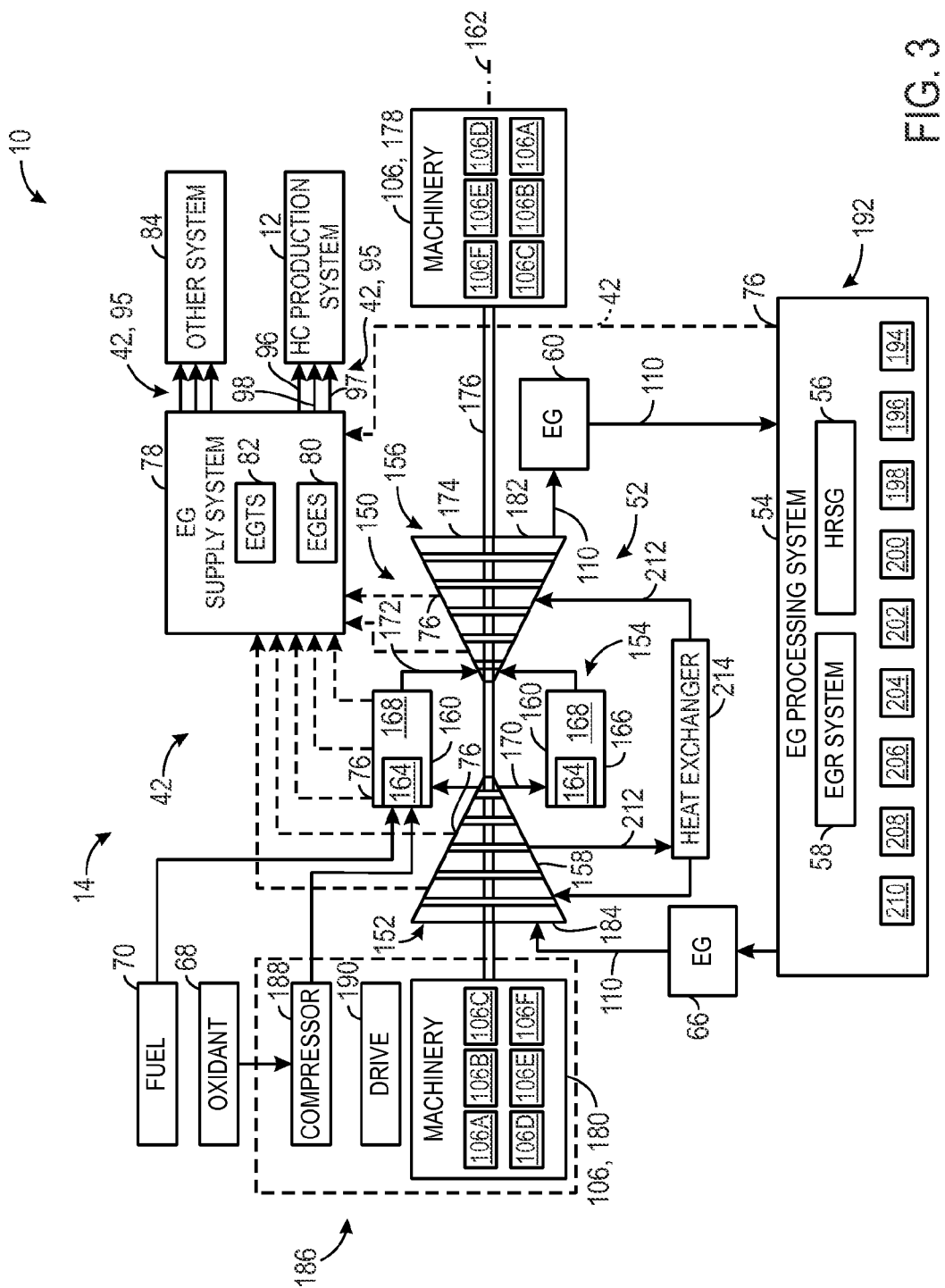
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC  | GEN  |      |      |      |      |
| MOC  | GBX  | GEN  |      |      |      |
| LP MOC | HP MOC | GEN |      |      |      |
| HP MOC | GBX | LP MOC | GEN |     |      |
| MOC  | GBX  | GEN  |      |      |      |
| MOC  |      |      |      |      |      |
| HP MOC | GBX | GEN | LP MOC |   |      |
| MOC  | GBX  | GEN  |      |      |      |
| MOC  | GBX  | DRV  |      |      |      |
| DRV  | GBX  | LP MOC | HP MOC | GBX | GEN |
| DRV  | GBX  | HP MOC | LP MOC | GEN |    |
| HP MOC | GBX | LP MOC | GEN |    |      |
| HP MOC | CLR | MOC |       |      |      |
| HP MOC | GBX | LP MOC | GBX | GEN |    |
| HP MOC | CLR | MOC |       |      |      |
| HP MOC | GBX | LP MOC | GEN |    |      |
| MOC  | HTR STGN | MOC |    |      |      |
| MOC  | GEN  | DRV  |      |      |      |
| MOC  | DRV  | GEN  |      |      |      |
| DRV  | MOC  | GEN  |      |      |      |

TABLE 1-continued

| 106A | 106B | 106C | 106D | 106E | 106F |
|------|------|------|------|------|------|
| DRV  | CLU  | MOC  | GEN  |      |      |
| DRV  | CLU  | MOC  | GBX  | GEN  |      |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location.

mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
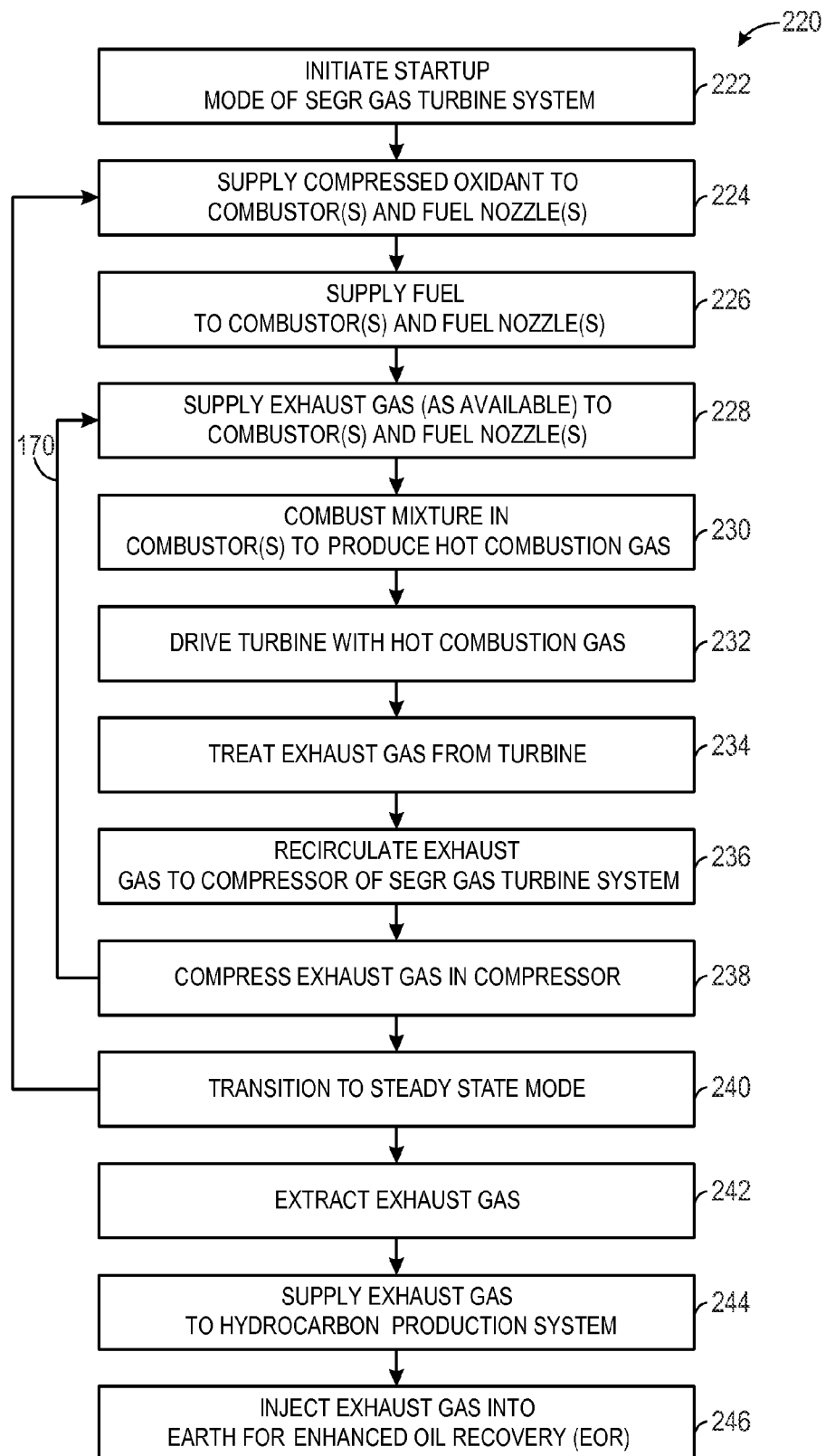
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

Figure 5:
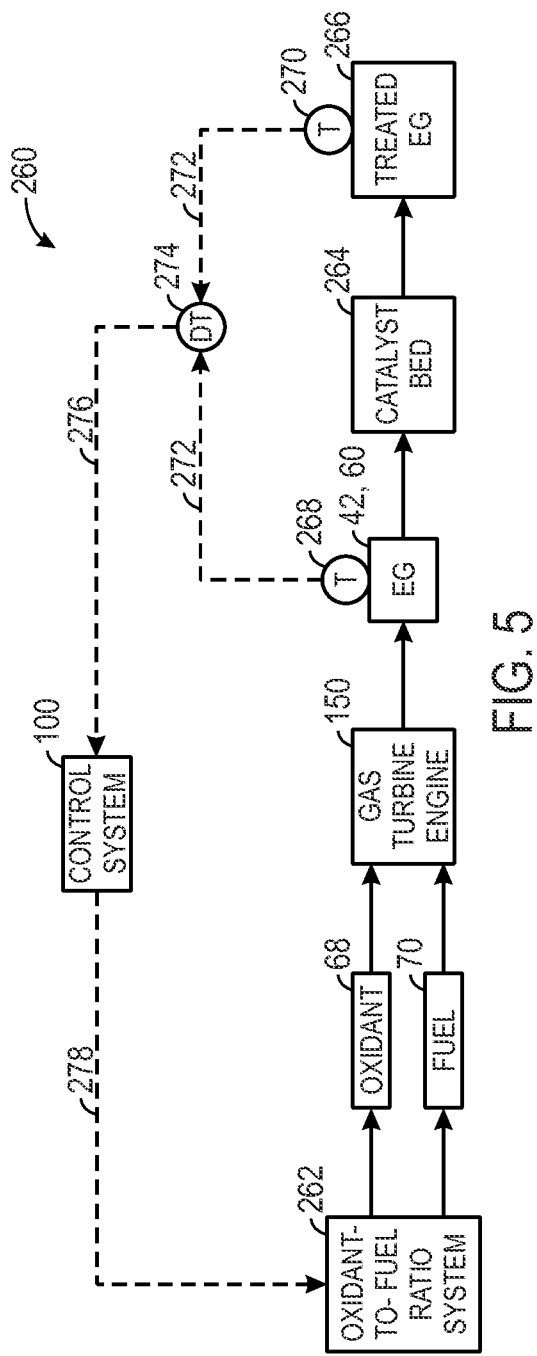
FIG. 5 is a schematic diagram of an embodiment of a gas turbine engine system with a catalyst bed.

FIG. 5 is a schematic diagram of an embodiment of a gas turbine engine system 260, which may share certain components of the SEGR gas turbine system 52 described in detail above. Elements in FIG. 5 in common with those shown in previous figures are labeled with the same reference numerals. In the illustrated embodiment, the gas turbine engine system 260 includes an oxidant-to-fuel ratio system 262 that adjusts a parameter to maintain an efficacy of a catalyst bed 264. For example, the oxidant-to-fuel ratio system 262 may adjust at least one of an oxidant flow rate of the oxidant 68, a fuel flow rate of the fuel 70, an exhaust gas flow rate of the exhaust gas 42, 60, a recycle flow rate of exhaust gas 66 recycled to the gas turbine engine 150, a temperature of the catalyst bed 264, a pressure of the catalyst bed 264, a diluent flow rate of diluent (or any other stream) to the catalyst bed 264, or any combination thereof. As described in detail below, the oxidant-to-fuel ratio system 262 may include various equipment, such as, but not limited to, control valves, pumps, compressors, blowers, or any combination thereof. As shown in FIG. 5, the gas turbine engine 150 may combust the oxidant 68 and the fuel 70 to produce the exhaust gas 42 or 60. The exhaust gas 42, 60 may be treated using the catalyst bed 264 to generate a treated exhaust gas 266. The catalyst bed 264 may include one or more of the catalysts described in detail above, such as, but not limited to, an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. For example, the catalyst bed 264 may include one or more catalysts to reduce a concentration of oxygen, carbon monoxide, hydrogen, nitrogen oxides, unburned hydrocarbons, or any combination thereof, in the exhaust gas 42, 60. In other words, the concentration of such gases in the treated exhaust gas 266 may be less than the concentrations of the gases in the exhaust gas 42, 60. The treated exhaust gas 266 may be used in a similar manner to the exhaust gas 42, 60. For example, the treated exhaust gas 266 may be transferred to the exhaust gas processing system 54, exhaust gas supply system 78, exhaust gas extraction system 80, exhaust gas treatment system 82, another system 84, enhanced oil recovery system 18, oil/gas extraction system 16, hydrocarbon production system 12, recycled as EGR to the gas turbine engine 150, or any combination thereof. The catalyst bed 264 may be disposed in one or more pieces of equipment, as described in detail below. In addition, in certain embodiments, a plurality of catalyst beds 264 may be used in series and/or parallel relative to one another. For example, different catalyst beds 264 may be used to treat different streams of the exhaust gas 42, 60.

As shown in FIG. 5, an inlet temperature sensor 268 may be used to indicate an inlet temperature of the exhaust gas 42, 60 flowing to the catalyst bed 264 (e.g., the exhaust gas 42, 60 upstream of the catalyst bed 264). In addition, an outlet temperature sensor 270 may be used to indicate an outlet temperature of the treated exhaust gas 266 generated by the catalyst bed 264 (e.g., the treated exhaust gas 266 downstream of the catalyst bed 264). Where a plurality of catalyst beds 264 is used, the inlet sensor 268 may measure a first temperature at an inlet of one of the plurality of catalyst beds 264 and the outlet sensor 270 may measure a second temperature at an outlet of one of the plurality of catalyst beds 264. The temperature sensors 268 and 270 may use one or more techniques for indicating temperature. For example, the temperature sensors 268 and 270 may utilize thermocouples, resistive temperature devices (RTDs), infrared sensors, bimetallic devices, thermometers, change-of-state sensors, or silicon diodes, or any combination thereof.

Each of the temperature sensors 268 and 270 may generate a temperature signal 272 that is sent to a differential temperature monitor 274, which may be used to determine a differential temperature across the catalyst bed 264. In other embodiments, the differential temperature monitor 274 may have separate input temperature and output temperature sensing portions (e.g., probes) to determine the differential temperature across the catalyst bed 264. As shown in FIG. 5, the differential temperature monitor 274 may generate an input signal 276 that is sent to the control system 100. Based on the differential temperature information conveyed by the input signal 276, the control system 100 may generate an output signal 278 that is sent to the oxidant-to-fuel ratio system 262. Specifically, the differential temperature information conveyed by the differential temperature monitor 274 may be used by the control system 100 to adjust at least one of the oxidant flow rate of the oxidant 68, or the fuel flow rate of the fuel 70, or any combination thereof, using the oxidant-to-fuel ratio system 262. In other embodiments, the control system 100 may be used to maintain operation of the gas turbine engine system 260 such that the differential temperature indicated by the differential temperature monitor 274 is maintained between a range, such as between approximately zero degrees Celsius to 400 degrees Celsius, 100 degrees Celsius to 300 degrees Celsius, or 150 degrees Celsius to 250 degrees Celsius. Operation of the catalyst bed 264 outside such a range may decrease the effectiveness of the catalyst bed 264 and/or exceed material limits for the catalyst bed 264.

In certain embodiments, the control system 100 may use the differential temperature monitor 274 and the oxidant-to-fuel ratio system 262 to operate the gas turbine engine 150 within a desired range of equivalence ratio values. For example, as described in detail above, the gas turbine engine 150 may be operated stoichiometrically such that the equivalence ratio is between approximately 0.95 to approximately 1.05. However, the disclosed embodiments may also include operation of the gas turbine engine 150 at an equivalence ratio of 1.0 plus or minus approximately 0.01, 0.02, 0.03, 0.04, 0.05, or more. Although the gas turbine engine 150 may be operating within a desired range of equivalence ratio values, the exhaust gas 42, 60 generated by the gas turbine engine 150 may have an undesirable composition under certain circumstances. For example, operating the gas turbine engine 150 outside of normal conditions may result in higher concentrations of oxygen, carbon monoxide, hydrogen, nitrogen oxides, and/or unburned hydrocarbons caused by incomplete combustion, which may be indicated by higher differential temperatures across the catalyst bed 264. Thus, the differential temperature monitor 274 may be used to help indicate that the catalyst bed 264 is operating at a higher reaction rate to reduce the concentration of such products of incomplete combustion. In certain situations, combustor-to-combustor or can-to-can variations of equivalence ratio caused by differences of oxidant 68 and/or fuel 70 flow rates to individual combustors 160 may result in some combustors producing more oxygen, carbon monoxide, hydrogen, nitrogen oxides, and/or unburned hydrocarbons than others. In addition, the combustion efficiency of individual combustors 160 may be less than desired because of unmixedness (e.g., inadequate or improper mixing of the oxidant 68 and the fuel 70), short residence time, cold spots, and/or other causes of incomplete combustion within the individual combustor 160. As a result, the combustors 160 may all emit higher levels of oxygen, carbon monoxide, hydrogen, nitrogen oxides, and/or unburned hydrocarbons even if the overall air-to-fuel ratio of the gas turbine engine 150 is stoichiometric. Furthermore, wear and tear of the combustion portion 168 may also result in higher emissions of oxygen, carbon monoxide, hydrogen, nitrogen oxides, and/or unburned hydrocarbons. For each of the causes described above, there may be either a local or global unmixedness of the combustion process that results in less than all the available fuel 70 or all of the available oxidant 68 being consumed in the combustion process within the gas turbine engine 150. For example, some oxidant 68 may still be present in the exhaust gas 42, 60 from the combustor 160 when the equivalence ratio is greater than one (e.g., fuel-rich operation) and some unburned hydrocarbons may still be present in the exhaust gas 42, 60 when the equivalence ratio is less than one (e.g., fuel-lean operation).

If the mixture of the oxidant 68 and fuel 70 entering the combustors 160 is on average stoichiometric, then the catalyst bed 264 may be used to complete the combustion process to the extinction of both. At stoichiometric operation, the differential temperature across the catalyst bed 264 may be expected to be the greatest. If the mixture of oxidant 68 and fuel 70 in the combustor 160 is fuel-rich (e.g., an equivalence ratio greater than approximately one), then the oxidant 68 will be in shorter supply in the catalyst bed 264, which may be used to complete the combustion process to the extinction of the available oxidant 68. In other words, any remaining oxidant 68 in the exhaust gas 42, 60 is combusted with unburned hydrocarbons or fuel 70 in the catalyst bed 264 until most or all the oxidant 68 is consumed. On the other hand, if the mixture of oxidant 69 and fuel 70 in the combustor 160 is fuel-lean (e.g., an equivalence ratio less than approximately 1), then the products of incomplete combustion (e.g., unburned fuel 70) will be in shorter supply in the catalyst bed 264, which may be used to complete the combustion process through extinction of the incomplete combustion products. In other words, any remaining unburned hydrocarbons in the exhaust gas 42, 60 are combusted with oxidant 68 in the catalyst bed 264 until most or all the unburned hydrocarbons are consumed.

As the equivalence ratio of the combustion process within the gas turbine engine 150 moves further from stoichiometric (e.g., further from an equivalence ratio equal to approximately 1), the heat released by the catalytic combustion of the remaining constituents may tend to decrease and the temperature rise across the catalyst bed 264 may also decrease. For example, when the equivalence ratio is greater than one, the amount of remaining oxidant 68 decreases as the equivalence ratio moves further away from one (e.g., increases). As there is less of the oxidant 68 for the catalyst bed 264 to combust as the equivalence ratio continues to increase, the differential temperature across the catalyst bed 264 will also decrease. Similarly, when the equivalence ratio is less than one, the amount of remaining unburned hydrocarbons decreases as the equivalence ratio moves further away from one (e.g., decreases). As there is less of the unburned hydrocarbons for the catalyst bed 264 to combust as the equivalence ratio continues to decrease, the differential temperature across the catalyst bed 264 will also decrease. Thus, the differential temperature indicated by the differential temperature monitor 274 may decrease. Therefore, if the differential temperature across the catalyst bed 264 exceeds a desired threshold, the equivalence ratio of the gas turbine engine 150 may be adjusted to be further from approximately one to reduce the differential temperature. The differential temperature threshold of the catalyst bed 264 may be determined based on various conditions such as, but not limited to, material constraints, steam production issues, or other operating or design constraints. The differential temperature measured by the differential temperature monitor 264 may be used to adjust the equivalence ratio of the gas turbine engine 150 to control a differential temperature threshold of the catalyst bed 264, an outlet temperature threshold of the catalyst bed 264, or other thresholds or constraints associated with the temperatures of the catalyst bed 264.

Figure 6:
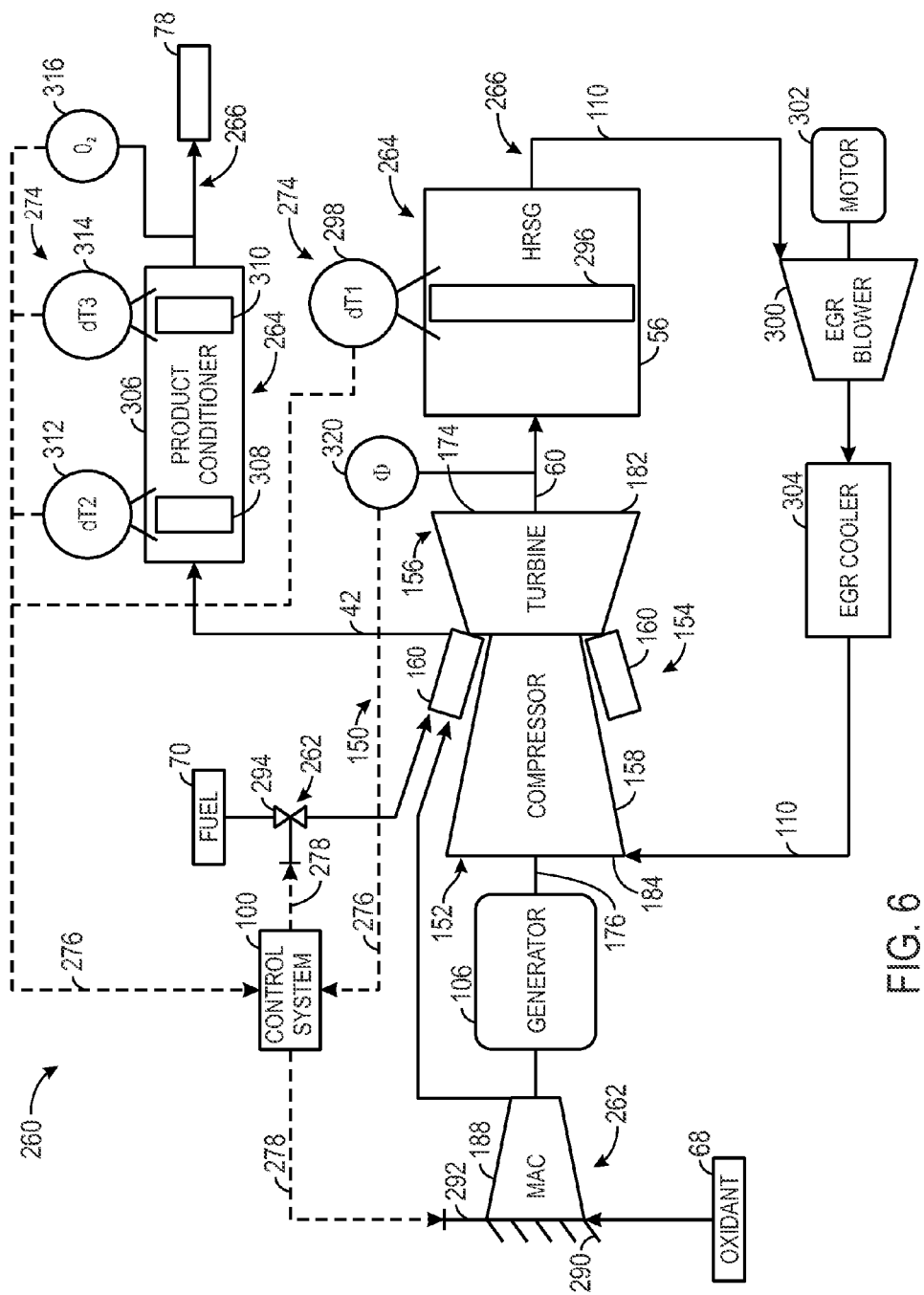
FIG. 6 is a schematic diagram of an embodiment of a gas turbine engine system with three catalyst beds.

FIG. 6 is a schematic diagram of an embodiment of the gas turbine engine system 260 with three catalyst beds 264. In the illustrated embodiment, the oxidant compressor 188 may include one or more inlet guide vanes 290 used to adjust the flow rate of the oxidant 68 taken in by the oxidant compressor 188. Specifically, increasing an angle of the inlet guide vanes 290 may increase the flow rate of the oxidant 60 and decreasing the angle of the inlet guide vanes 290 may decrease the flow rate of the oxidant 68. Thus, the inlet guide vanes 290 and/or the oxidant compressor 188 may be part of the oxidant-to-fuel ratio system 262. The inlet guide vanes 290 may be controlled by a guide vane actuator 292. As shown in FIG. 6, the guide vane actuator 292 may receive the output signal 278 from the control system 100. Thus, the control system 100 may adjust the inlet guide vanes 290 via the guide vane actuator 292 to adjust the oxidant flow rate of the oxidant 68 based at least in part on the differential temperature across one or more of the catalyst beds 264. In further embodiments, the control system 100 may use other techniques to adjust the flow rate of the oxidant 68, such as, but not limited to, adjusting the speed of the oxidant compressor 188 and/or other oxidant compressors, adjusting an inlet or outlet control valve of the oxidant compressor 188 and/or other oxidant compressors, and/or adjusting the recycle or blow-off of oxidant 68 from the oxidant compressor 188 and/or other oxidant compressors.

In the illustrated embodiment, a fuel control valve 294 may be used to adjust the fuel flow rate of the fuel 70 to the combustor 160. Thus, the fuel control valve 294 may also be part of the oxidant-to-fuel ratio system 262. As shown in FIG. 6, the fuel control valve 294 may receive the output signal 278 form the control system 100. Thus, the control system 100 may use the fuel control valve 294 to adjust the fuel flow rate of the fuel 70 based at least in part on the differential temperature across one or more of the catalyst beds 264.

In the illustrated embodiment, the exhaust gas 60 may be used in the HRSG 56 to generate steam. The HRSG 56 may include an HRSG catalyst bed 296. Thus, the HRSG catalyst bed 296 may be used to treat the exhaust gas 60 before, after, and/or during generation of steam in the HRSG 56. An HRSG catalyst bed differential temperature monitor 298 may be used to indicate the differential temperature across the HRSG catalyst bed 296. Thus, the HRSG catalyst bed differential temperature monitor 298 may send the output signal 276 to the control system 100.

In certain embodiments, the exhaust gas 60 from the HRSG 56 may travel through the exhaust recirculation path 110 back to the combustor section 154 of the gas turbine engine 150. Specifically, the exhaust gas 60 may travel to an exhaust gas recirculation blower 300, which may be used to increase a pressure of the exhaust gas 60. The exhaust gas recirculation blower 300 may be driven using a motor 302. After passing through the exhaust gas recirculation blower 300, the exhaust gas 60 may pass through an exhaust gas recirculation cooler 304, which may be used to reduce a temperature of the exhaust gas 60 using a coolant, such as, but not limited to, water. For example, the exhaust recirculation cooler 304 may be an indirect heat exchanger that uses cooling water to cool the exhaust gas 60. The exhaust gas recirculation blower 300, motor 302, and exhaust gas recirculation cooler 304 may be part of the exhaust gas (EG) processing system 54 described above.

In certain embodiments, a portion of the exhaust gas 42 may be directed to a product conditioner 306, which may be used to treat the exhaust gas 42 prior to use by downstream users, such as the exhaust gas (EG) supply system 78. Thus, the product conditioner 306 may be part of the exhaust gas (EG) treatment system 82 described above. For example, the product conditioner 306 may include one or more catalyst beds 264. In the illustrated embodiment, the product conditioner 306 includes a first product conditioner catalyst bed 308 and a second product conditioner catalyst bed 310. In other embodiments, the product conditioner 306 may include three, four, five or more catalyst beds 264. The first product conditioner catalyst 308 may include a first product conditioner catalyst bed differential temperature monitor 312 and the second product conditioner catalyst bed 310 may include a second product conditioner catalyst bed differential temperature monitor 314. Each of the differential temperature monitors 312 and 314 may generate input signals 276 sent to the control system 100. In certain embodiments, an oxidant sensor 316 may be used to indicate an oxidant concentration of the exhaust gas 42 flowing out of the product conditioner 306. The oxidant sensor 316 may also send an input signal 276 to the control system 100. The oxygen sensor 316 may be used to provide an indication of the oxygen concentration of the exhaust gas generated by the product conditioner 306 (e.g., the treated exhaust gas 266). Thus, the indication of the oxygen concentration by the oxygen sensor 316 may provide feedback of the performance of the first and second catalyst beds 308 and 310. In addition, the indication of the oxygen concentration by the oxygen sensor 316 may be used to establish the differential temperature thresholds associated with the first and second differential temperature monitors 312 and 314. For example, if the oxygen concentration of the treated exhaust gas 266 indicated by the oxygen sensor 316 is above a desired threshold, the differential temperature thresholds associated with the first and/or second differential temperature monitors 312 and 314 may be adjusted to reduce the oxygen concentration of the treated exhaust gas 266. For example, during operation at an equivalence ratio greater than one, the catalyst bed 264 may have upper and lower differential temperature thresholds to establish a range of desired operation. If the oxygen concentration of the treated exhaust gas 266 is greater than desired, one or both of the upper and lower differential temperature thresholds may be decreased so the catalyst bed 264 operates to combust a greater amount of the oxidant 68.

In certain embodiments, the control system 100 may be configured to operate the gas turbine engine system 260 based on a priority scheme (e.g., a hierarchy). For example, the control system 100 may maintain the ratio of the oxidant 68 to the fuel 70 within a first range as a first priority based at least in part on a first differential temperature across the HRSG catalyst bed 296 as indicated by the HRSG differential temperature monitor 298, maintain the first differential temperature across the HRSG catalyst bed 296 within a second range as a second priority, maintain a second differential temperature across the first catalyst bed 308 as indicated by the first differential temperature monitor 312 within a third range as a third priority, and maintain a third differential temperature across the second catalyst bed 310 as indicated by the second differential temperature monitor 314 within a fourth range as a fourth priority. Such a priority scheme may be used by the control system 100 to prioritize the various operating conditions of the gas turbine engine 150 and decouple the control response of the various controllers of the control system 100. In other embodiments, different priority schemes or other decoupling methods may be used by the control system 100.

In the illustrated embodiment, a lambda sensor or a plurality of lambda sensors 320 may be used to provide an indication of the equivalence ratio of the exhaust gas 60. Thus, the lambda sensor 320 may provide the input signal 276 indicative of the equivalence ratio to the control system 100. The equivalence ratio value provided by the lambda sensor 320 may be used by the control system 100 to adjust the oxidant flow rate of the oxidant 68, or the fuel flow rate of the fuel 70, or any combination thereof, to achieve substantially stoichiometric combustion of the gas turbine engine 150. In addition, the equivalence ratio value provided by the lambda sensor 320 may be used by the control system 100 to adjust the differential temperature thresholds associated with one or more of the differential temperature monitors 298, 312, and/or 314. For example, for operation at an equivalence ratio greater than one, the differential temperature thresholds may be decreased as the equivalence ratio moves further away from one. In addition, the control system 100 may include a desired value, or setpoint, for the equivalence ratio. For example, the equivalence ratio setpoint may be adjusted by the control system 100 to be between approximately 1.0001 to 1.1, 1.001 to 1.05, 1.01 to 1.04, or 1.02 to 1.03 to maintain a slightly fuel-rich combustion environment and produce exhaust gas 42, 60 with a lower oxidant concentration, a lower $NO_X$ concentration, and/or a lower ratio of $NO_2$ to NO. Alternatively, the equivalence ratio setpoint may be adjusted by the control system 100 to be between approximately 0.9 to 0.9999, 0.95 to 0.999, 0.96 to 0.99, or 0.97 to 0.98 to maintain a slightly fuel-lean combustion environment and produce exhaust gas 42, 60 with a lower concentration of carbon monoxide, hydrogen, nitrogen oxides, or unburned hydrocarbons at the expense of a higher concentration of oxygen and/or $NO_X$. Alternatively, the equivalence ratio setpoint may be adjusted by the control system 100 to be approximately 1.

Figure 7:
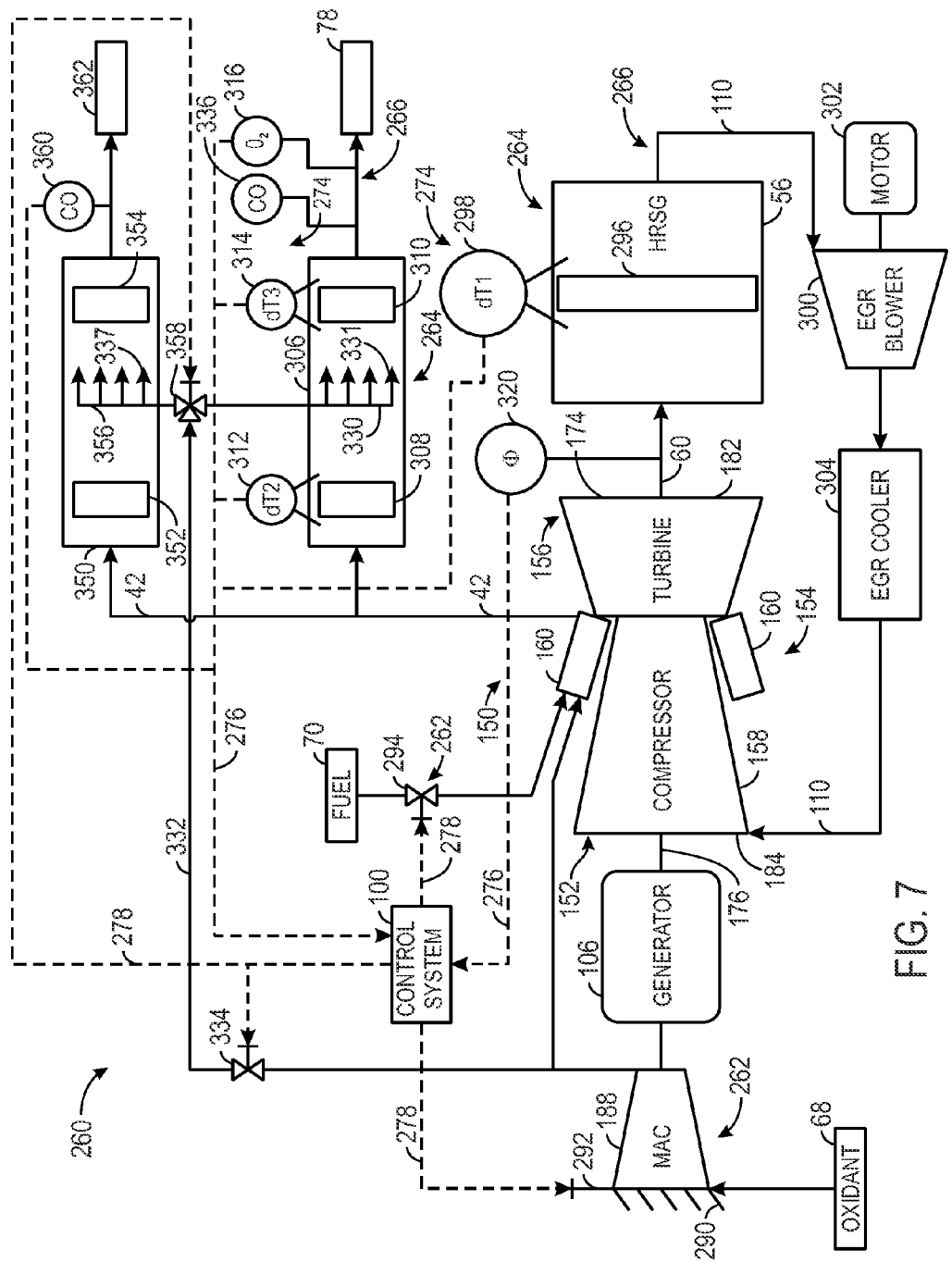
FIG. 7 is a schematic diagram of an embodiment of a gas turbine engine system with five catalyst beds.

FIG. 7 is a schematic diagram of an embodiment of the gas turbine engine system 260 that includes one or more oxidant injection systems. Specifically, the product conditioner 306 may include a product conditioner oxidant injection system 330, which may be used to inject ambient air, pure oxygen, oxygen-enriched air, oxygen-reduced air, oxygen-nitrogen mixtures, or any suitable oxidant that facilitates combustion of the fuel 70. An oxidant injection conduit 332 conveys the oxidant 68 from the oxidant compressor 188 to the oxidant injection system 330. An oxidant control valve 334 may be used to adjust the flow rate of the oxidant 68 to the oxidant injection system 330. The oxidant control valve 334 may receive the output signal 278 from the control system 100. As shown in FIG. 7, the oxidant injection system 330 is disposed upstream of the second product conditioner catalyst bed 310. In other words, the oxidant injection system 330 is disposed between the first and second catalyst beds 308 and 310. In embodiments in which a $NO_X$ reduction catalyst (e.g., a catalyst selected for reducing the concentration of $NO_X$ in the exhaust gas 42) is placed within the first catalyst bed 308, use of the oxidant injection system 330 may favor the reduction of $NO_X$ in the first catalyst bed 308. In other embodiments, the oxidant injection system 330 may be disposed upstream of the first product conditioner catalyst bed 308 or upstream of both the first and second product conditioner catalyst beds 308 and 310. The oxidant injection system 330 may include one or more oxidant injectors 331 for injecting the oxidant 68 into the stream of the exhaust gas 42 flowing through the product conditioner 306. The injection of the oxidant 68 by the oxidant injection system 330 may enable increased combustion of the carbon monoxide and unburned hydrocarbons in the exhaust gas 42. In certain embodiments, the addition of the oxidant 68 by the oxidant injection system 330 may enable complete combustion of the carbon monoxide and unburned hydrocarbons.

Such reduction and/or elimination of the carbon monoxide, unburned hydrocarbons, and any other undesirable components from the exhaust gas 42 using the oxidant injection system 330 may be desirable in certain situations, such as when the exhaust gas 42 (e.g., treated exhaust gas 266) is vented to the atmosphere during startup, shutdown, or other transient conditions. By reducing and/or eliminating carbon monoxide and unburned hydrocarbons from the vented exhaust gas 42, compliance with emissions regulations may be maintained. In certain embodiments, a product conditioner carbon monoxide sensor 336 may be used to provide an indication of the concentration of the carbon monoxide in the exhaust gas 42 from the product conditioner 306. The carbon monoxide sensor 336 may send the input signal 276 to the control system 100 to provide an indication of the performance of the oxidant injection system 330. For example, if the concentration of carbon monoxide indicated by the carbon monoxide sensor 336 is above a carbon monoxide threshold, the control system 100 may open the oxidant control valve 334 to increase the flow rate of the oxidant 68 to the oxidant injection system 330. Similarly, if the carbon monoxide concentration indicated by the carbon monoxide sensor 336 is below the threshold, the control system 100 may close the oxidant control valve 334 to reduce consumption of the oxidant 68 by the oxidant injection system 330. In other embodiments, the carbon monoxide sensor 336 may be replaced or augmented by a device sensitive to hydrogen, nitrogen oxides, unburned hydrocarbons, and/or other constituents that may indicate incomplete combustion of the fuel 70 and oxidant 68.

In further embodiments, other injection systems (e.g., an oxidation fuel injection system) may be used with the product conditioner 306 either together with or in place of the oxidant injection system 330 described above. These injection systems may be used to inject materials other than the oxidant 68 upstream of one or more of the catalyst beds of the product conditioner 306. In one embodiment, an oxidation fuel injection system may inject an oxidation fuel, such as, but not limited to, hydrogen, carbon monoxide, methane, natural gas, fuel 70, other hydrocarbon fuels, or any combination thereof. In the presence of the catalyst bed, the injected oxidation fuel may react with excess oxygen in the exhaust gas 42, thereby reducing the concentration of oxygen in the treated exhaust gas 266. Feedback (e.g., input signal 276) from the oxidant sensor 316 may be used by the control system 100 to adjust the amount of oxidation fuel that is injected by the injection system. For example, if the amount of oxygen in the treated exhaust gas 266 is above an oxygen threshold, the control system 100 may send the output signal 278 to a control valve or similar device associated with the injection system to increase the amount of injected oxidation fuel. Similarly, the control system 100 may be used to reduce the amount of injected oxidation fuel if the oxygen threshold is below the oxygen threshold. Further, the differential temperature across the catalyst bed may be used by the control system 100 to adjust the flow rate of the injected oxidation fuel.

In certain embodiments, a vent product conditioner 350 may be used to treat the exhaust gas 42 (e.g., treated exhaust gas 266) that is being normally vented to the atmosphere. For example, the vent product conditioner 350 may be used when the product conditioner 306 is not being used or has reached a maximum capacity. The vent product conditioner 350 may include a first vent product conditioner catalyst bed 352 and a second vent product conditioner catalyst bed 354. In other embodiments, the vent product conditioner 350 may include additional catalyst beds. As shown in FIG. 7, the first and second catalyst beds 352 and 354 may be configured in a similar manner to the first and second catalyst beds 308 and 310 of the product conditioner 306. In addition, the vent product conditioner 350 may include a vent product conditioner oxidant injection system 356 to inject the oxidant 68 into the vent product conditioner 350. Specifically, the oxidant 68 may be injected into the exhaust gas 42 via one or more oxidant injectors 357. The oxidant injection system 356 may be disposed upstream of one or both of the first and second catalyst beds 352 and 354. In the illustrated embodiment, the oxidant injection system 356 is disposed upstream of the second vent catalyst bed 354. When the vent product conditioner 350 is used together with the product conditioner 306, a three way valve 358 may be used to adjust the flow rates of the oxidant 68 to the oxidant injection systems 330 and 356. The three way valve 358 may receive the output signal 278 from the control system 100. Thus, the three way valve 358 may be used to provide the oxidant 68 to one, both, or, neither of the product conditioners 306 and 350. A carbon monoxide sensor 360 may be used to provide an indication of the carbon monoxide concentration of the exhaust gas 42 (e.g., treated exhaust gas 266) from the vent product conditioner 350 in a similar manner to the carbon monoxide sensor 336 of the product conditioner 306. In certain embodiments, the exhaust gas 42 from the vent product conditioner 350 may pass through a power recovery expander 362 (e.g., a turbine or energy recovery turbine) prior to venting to atmosphere. The power recovery expander 362 may be used to recover energy from the exhaust gas 42 before venting to the atmosphere.

Figure 8:
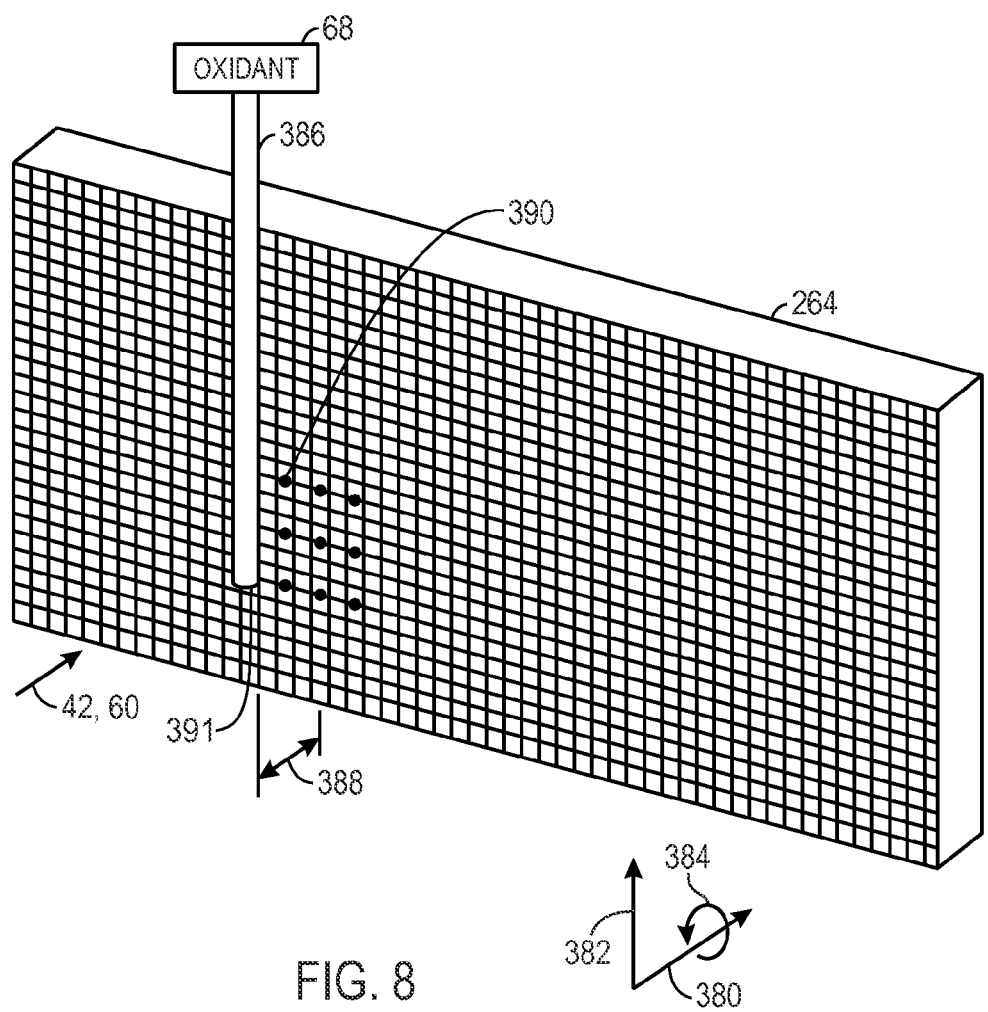
FIG. 8 is a perspective view of an embodiment of a catalyst bed with an oxidant injection system.

FIG. 8 is a perspective view of an embodiment of the catalyst bed 264. The axial direction of the gas turbine engine 150 is indicated by arrow 380, the radial direction indicated by arrow 382, and the circumferential direction is indicated by arrow 384. These directions are all with respect to the rotational axis 162. An oxidant injection conduit 386 is disposed upstream of the catalyst bed 264 by a distance 388. As described below, the injection of the oxidant 68 by the oxidant injection conduit 386 may be used to help determine the equivalence ratio at which the gas turbine engine 150 is operating. As shown in FIG. 8, the oxidant injection conduit 386 enables the oxidant 68 to enter the stream of the exhaust gas 42, 60 flowing into the catalyst bed 264. An array of catalyst bed thermocouples 390 may be disposed in the catalyst bed 264 directly and axially 380 downstream of an outlet 391 of the oxidant injection conduit 386. Thus, the plurality of thermocouples 390 may be used to indicate the effect of the injected oxidant 68 on the temperature within the catalyst bed 264. Specifically, differential temperature values may be determined between an inlet temperature to the catalyst bed 264 and the temperatures indicated by the plurality of thermocouples 390. For example, the temperature indicated by the inlet temperature sensor 268 or the input temperature sensing portion of the differential temperature monitor 274 may be used to determine the inlet temperature to the catalyst bed 264. The information provided by the plurality of thermocouples 390 may be used to determine whether the gas turbine engine 150 is operating with an equivalence ratio less than or greater than approximately one, as described in detail below.

Figure 9:
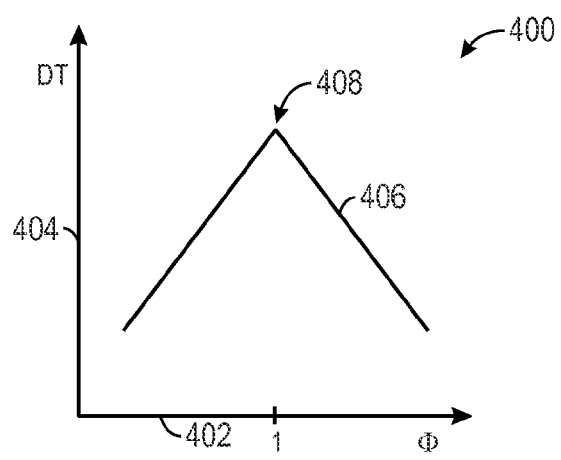
FIG. 9 is a graph of a relationship between a differential temperature of a catalyst bed and an equivalence ratio for an embodiment of a gas turbine engine system including the catalyst bed.

FIG. 9 is a graph 400 of the relationship between differential temperature and equivalence ratio for the gas turbine engine system 260. In the graph 400, an x-axis 402 represents the equivalence ratio and a y-axis 404 indicates the differential temperature of the catalyst bed 264. As shown in FIG. 9, the relationship between the differential temperature and the equivalence ratio follows a curve 406 that has a peak 408 at a value of the equivalence ratio equal to approximately one. In other words, the differential temperature has the peak 408 at an equivalence ratio of approximately one, and the curve 406 decreases approximately linearly on either side of the peak 408. Therefore, for a given differential temperature threshold, there may be two equivalence ratios at which that gas turbine engine 150 may operate. Thus, the injection of the oxidant 68 using the oxidant injection conduit 386 shown in FIG. 8 may be used to determine which side of stoichiometric operation the gas turbine engine 150 is operating. The oxidant injection conduit 386 is placed far enough up stream (e.g., the distance 388) to provide for adequate mixing of the oxidant 68 and the exhaust gas 42, 60 in the volume around the outlet 391. The plurality of thermocouples 390 provides an indication of the temperatures within or downstream of the catalyst bed 264. Thus, differential temperature values across the catalyst bed 264 downstream of the outlet 391 may be determined between the inlet temperature of the catalyst bed 264 and the temperatures indicated by the plurality of thermocouples 390. If the differential temperature values determined using the plurality of thermocouples 390 are greater than the differential temperature of the overall catalyst bed 264 (e.g., as indicated by differential temperature monitor 274), then the exhaust gas 42, 60 is likely oxygen-limited and therefore, the gas turbine engine 150 is operating at an equivalence ratio greater than approximately one (e.g., fuel-rich operation). If, however, the differential temperature values determined using the plurality of thermocouples 390 are less than the differential temperature of the overall catalyst bed 264 (e.g., as indicated by differential temperature monitor 274), the gas turbine engine 150 is likely carbon monoxide-limited and is therefore operating with an equivalence ratio less than approximately one (e.g., fuel-lean operation). In this case, the control system 100 may be used to increase the setpoint of the equivalence ratio such that the gas turbine engine 150 operates with the equivalence ratio greater than approximately one (e.g., fuel-rich operation). Although FIG. 8 shows the plurality of thermocouples 390 in a three-by-three array, in other embodiments, other configuration and numbers of the plurality of thermocouples 390 may be used. In addition, in other embodiments, multiple injection points of the oxidant 68 may be used with the catalyst bed 264.

As described above, certain embodiments of the gas turbine engine system 260 may include the gas turbine engine 150 configured to combust the oxidant 60 and the fuel 70 to generate the exhaust gas 42, 60 and the catalyst bed 264 configured to treat the exhaust gas 42, 60 from the gas turbine engine 150 to generate the treated exhaust gas 266. The system 260 may also include the differential temperature monitor 274 configured to sense the differential temperature between the inlet temperature of the exhaust gas 42, 60 and the outlet temperature of the treated exhaust gas 266 and the oxidant-to-fuel ratio system 262 configured to adjust at least one of an oxidant flow of the oxidant 68, or a fuel flow rate of the fuel 70, or any combination thereof, based at least in part on the differential temperature. The differential temperature provided by the differential temperature monitor 274 may provide a more accurate and/or faster indication of the concentration of carbon monoxide, hydrogen, oxygen, nitrogen oxides, unburned hydrocarbons, or any combination thereof, in the exhaust gas 42, 60. Thus, the control system 100 may use the oxidant-to-fuel ratio system 262 to adjust operation of the gas turbine engine 150 to achieve desired operation. In addition, in certain embodiments, the oxygen injection system 330, 356 may be used to inject the oxidant 68 upstream of the catalyst bed 264 to reduce the concentration of carbon monoxide and/or unburned hydrocarbons in the exhaust gas 42, 60. In further embodiments, the oxidant 68 may be injected upstream of the catalyst bed 264 and the plurality of thermocouples 390 may be used to provide an indication of which side of stoichiometric operation the gas turbine engine 150 is operating. This information may be used by the control system 100 to adjust operation of the gas turbine engine 150. In addition, injection of the oxidant 68 by the oxidant injection system 330, 356 may help the gas turbine engine 150 to operate within emissions regulations.

ADDITIONAL DESCRIPTION

The present embodiments provide a system and method for gas turbine engines. It should be noted that any one or a combination of the features described above may be utilized in any suitable combination. Indeed, all permutations of such combinations are presently contemplated. By way of example, the following clauses are offered as further description of the present disclosure:

Embodiment 1

A system, comprising: a gas turbine engine configured to combust an oxidant and a fuel to generate an exhaust gas; a catalyst bed configured to treat the exhaust gas from the gas turbine engine to generate a treated exhaust gas; a differential temperature monitor configured to monitor a differential temperature between an inlet temperature of the exhaust gas and an outlet temperature of the treated exhaust gas; and an oxidant-to-fuel ratio system configured to adjust at least one of an oxidant flow rate of the oxidant, or a fuel flow rate of the fuel, or any combination thereof, based at least in part on the differential temperature.

Embodiment 2 the system of embodiment 1, wherein the oxidant-to-fuel ratio system comprises an oxidant compressor configured to adjust the oxidant flow rate.

Embodiment 3

The system defined in any preceding embodiment, wherein the oxidant-to-fuel ratio system comprises an inlet guide vane of the oxidant compressor configured to adjust the oxidant flow rate.

Embodiment 4

The system defined in any preceding embodiment, wherein the oxidant-to-fuel ratio system comprises a fuel control valve configured to adjust the fuel flow rate.

Embodiment 5

The system defined in any preceding embodiment, comprising a heat recovery steam generator (HRSG) having the catalyst bed, wherein the HRSG is configured to generate steam using the exhaust gas or the treated exhaust gas.

Embodiment 6

The system defined in any preceding embodiment, comprising a heat recovery steam generator (HRSG) disposed upstream of the exhaust gas blower, wherein the HRSG is configured to generate steam from the exhaust flow from the turbine.

Embodiment 7

The system defined in any preceding embodiment, wherein the product conditioner comprises a plurality of catalyst beds.

Embodiment 8

The system defined in any preceding embodiment, wherein the plurality of catalyst beds comprises a first catalyst bed disposed upstream of a second catalyst bed, wherein the system comprises an oxidant injection system configured to inject a catalyst bed oxidant downstream of the first catalyst bed, and wherein the first catalyst bed comprises a $NO_X$ catalyst configured to reduce a concentration of $NO_X$ in the exhaust gas.

Embodiment 9

The system defined in any preceding embodiment, comprising an oxidant injection system configured to inject a catalyst bed oxidant upstream of the catalyst bed.

Embodiment 10

The system defined in any preceding embodiment, comprising a localized differential temperature monitor configured to monitor a localized differential temperature between the inlet temperature of the exhaust gas and a localized outlet temperature of the treated exhaust gas downstream of an injection point of the catalyst bed oxidant, wherein the oxidant-to-fuel ratio system is configured to adjust at least one of the oxidant flow rate, or the fuel flow rate, or any combination thereof, based at least in part on a comparison of the localized differential temperature with the differential temperature.

Embodiment 11

The system defined in any preceding embodiment, comprising a gas composition sensor disposed downstream of the catalyst bed, wherein the gas composition sensor is configured to sense a gas concentration of at least one of oxygen, carbon monoxide, hydrogen, nitrogen oxides, or unburned hydrocarbons, or any combination thereof, and wherein the oxidant injection system is configured to adjust a catalyst bed oxidant flow rate of the catalyst bed oxidant based at least in part on the gas concentration.

Embodiment 12

The system defined in any preceding embodiment, comprising an oxidant compressor configured to provide the oxidant to the gas turbine engine and the catalyst bed oxidant upstream of the catalyst bed.

Embodiment 13

The system defined in any preceding embodiment, comprising an oxidant-to-fuel sensor configured to sense an oxidant-to-fuel ratio of the exhaust gas, wherein the oxidant-to-fuel ratio system is configured to adjust at least one of the oxidant flow rate of the oxidant, or the fuel flow rate of the fuel, or any combination thereof, based at least in part on the oxidant-to-fuel ratio.

Embodiment 14

The system defined in any preceding embodiment, wherein the gas turbine engine is a stoichiometric exhaust gas recirculation (SEGR) gas turbine engine.

Embodiment 15

The system defined in any preceding embodiment, comprising an exhaust gas extraction system coupled to the gas turbine engine, and a hydrocarbon production system coupled to the exhaust gas extraction system.

Embodiment 16

A method, comprising: combusting an oxidant and a fuel in a gas turbine engine to generate an exhaust gas; treating the exhaust gas from the gas turbine engine in a catalyst bed to generate a treated exhaust gas; monitoring a differential temperature between an inlet temperature of the exhaust gas and an outlet temperature of the treated exhaust gas using a differential temperature monitor; and adjusting at least one of an oxidant flow rate of the oxidant, or a fuel flow rate of the fuel, or any combination thereof, based at least in part on the differential temperature using an oxidant-to-fuel ratio system.

Embodiment 17

The method or system defined in any preceding embodiment, comprising adjusting the oxidant flow rate using an oxidant compressor.

Embodiment 18

The method or system defined in any preceding embodiment, comprising at least one of adjusting the oxidant flow rate by adjusting a speed of the oxidant compressor, adjusting the oxidant flow rate using an inlet guide vane of the oxidant compressor, adjusting the oxidant flow rate using an inlet control valve of the oxidant compressor, adjusting the oxidant flow rate using an outlet control valve of the oxidant compressor, adjusting a recycle of oxidant from the oxidant compressor, or adjusting a blow-off of oxidant from the oxidant compressor, or any combination thereof.

Embodiment 19

The method or system defined in any preceding embodiment, comprising adjusting the fuel flow rate using a fuel control valve.

Embodiment 20

The method or system defined in any preceding embodiment, comprising generating steam using the exhaust gas or the treated exhaust gas in a heat recovery steam generator (HRSG) having the catalyst bed.

Embodiment 21

The method or system defined in any preceding embodiment, comprising injecting a catalyst bed oxidant upstream of the catalyst bed using an oxidant injection system.

Embodiment 22

The method or system defined in any preceding embodiment, monitoring a localized differential temperature between the inlet temperature of the exhaust gas and a localized outlet temperature of the treated exhaust gas downstream of an injection point of the catalyst bed oxidant using a localized differential temperature monitor; and adjusting at least one of the oxidant flow rate of the oxidant, or the fuel flow rate of the fuel, or any combination thereof, based at least in part on a comparison of the localized differential temperature with the differential temperature.

Embodiment 23

The method or system defined in any preceding embodiment, comprising: sensing a gas concentration of at least one of oxygen, carbon monoxide, hydrogen, nitrogen oxides, or unburned hydrocarbons, or any combination thereof, downstream of the catalyst bed using a gas composition sensor; and adjusting the catalyst bed oxidant flow rate based at least in part on the gas concentration.

Embodiment 24

The method or system defined in any preceding embodiment, comprising: sensing an oxidant-to-fuel ratio of the exhaust gas using an oxidant-to-fuel sensor; and adjusting at least one of the oxidant flow rate of the oxidant, or the fuel flow rate of the fuel, or any combination thereof, based at least in part on the oxidant-to-fuel ratio.

Embodiment 25

The method or system defined in any preceding embodiment, wherein combusting comprises stoichiometrically combusting the mixture.

Embodiment 26

The method or system defined in any preceding embodiment, comprising extracting a portion of the treated exhaust gas, and routing the portion of the treated exhaust gas to a hydrocarbon production system.

Embodiment 27

A system, comprising: a controller, comprising: one or more tangible, non-transitory, machine-readable media collectively storing one or more sets of instructions; and one or more processing devices configured to execute the one or more sets of instructions to: combust an oxidant and a fuel in a gas turbine engine to generate an exhaust gas; treat the exhaust gas from the gas turbine engine in a catalyst bed to generate a treated exhaust gas; monitor a differential temperature between an inlet temperature of the exhaust gas and an outlet temperature of the treated exhaust gas using a differential temperature monitor; transmit a differential temperature signal from the differential temperature monitor to a control system; and adjust a ratio of the oxidant to the fuel based at least in part on the differential temperature signal.

Embodiment 28

The method or system defined in any preceding embodiment, wherein the one or more processing devices are configured to execute the one or more sets of instructions to maintain an oxidant-to-fuel ratio of the gas turbine engine between approximately 1.0001 to 1.1.

Embodiment 29

The method or system defined in any preceding embodiment, wherein the one or more processing devices are configured to execute the one or more sets of instructions to maintain the differential temperature between approximately zero degrees Celsius to 400 degrees Celsius.

Embodiment 30

The method or system defined in any preceding embodiment, wherein the one or more processing devices are configured to execute the one or more sets of instructions to: treat the exhaust gas from the gas turbine engine in a first catalyst bed disposed in a heat recovery steam generator (HRSG) to generate a first treated exhaust gas; monitor a first differential temperature between an inlet temperature of the exhaust gas and a first outlet temperature of the first treated exhaust gas using a first differential temperature monitor; treat the exhaust gas from the gas turbine engine in a second catalyst bed disposed in a product conditioner to generate a second treated exhaust gas; monitor a second differential temperature between an inlet temperature of the exhaust gas and a second outlet temperature of the second treated exhaust gas using a second differential temperature monitor; treat the second treated exhaust gas from the second catalyst bed in a third catalyst bed disposed downstream of the second catalyst bed in the product conditioner to generate a third treated exhaust gas; monitor a third differential temperature between a treated inlet temperature of the second treated exhaust gas and a third outlet temperature of the third treated exhaust gas using a third differential temperature monitor; maintain the ratio of the oxidant to the fuel within a first range as a first priority based at least in part on the first differential temperature; maintain the first differential temperature within a second range as a second priority; maintain the second differential temperature within a third range as a third priority; and maintain the third differential temperature within a fourth range as a fourth priority.

Embodiment 31

The method or system defined in any preceding embodiment, wherein the one or more processing devices are configured to execute the one or more sets of instructions to: monitor a localized differential temperature between the inlet temperature of the exhaust gas and a localized outlet temperature of the treated exhaust gas downstream of an oxidant injection system disposed upstream of the catalyst bed, and adjust at least one of the oxidant flow rate, or the fuel flow rate, or any combination thereof, based at least in part on a comparison of the localized differential temperature with the differential temperature.

Embodiment 32

The method or system defined in any preceding embodiment, wherein the one or more processing devices are configured to execute the one or more sets of instructions to: sense a gas concentration of at least one of oxygen, carbon monoxide, hydrogen, nitrogen oxides, or unburned hydrocarbons, or any combination thereof, downstream of an oxidant injection system disposed upstream of the catalyst bed using a gas composition sensor; and adjust the catalyst bed oxidant flow rate based at least in part on the gas concentration.

Embodiment 32

The method or system defined in any preceding embodiment, wherein the one or more processing devices are configured to execute the one or more sets of instructions to: sense an oxidant-to-fuel ratio of the exhaust gas using an oxidant-to-fuel sensor; and adjust at least one of the oxidant flow rate of the oxidant, or the fuel flow rate of the fuel, or any combination thereof, based at least in part on the oxidant-to-fuel ratio.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine engine configured to combust an oxidant and a fuel to generate an exhaust gas;
   a catalyst bed configured to treat at least a portion of the exhaust gas from the gas turbine engine to generate a treated exhaust gas;
   a first differential temperature monitor configured to monitor a first differential temperature between a first temperature of the portion of exhaust gas upstream of the catalyst bed and a second temperature of the treated exhaust gas downstream of the catalyst bed;
   an oxidant-to-fuel ratio system configured to adjust an oxidant flow rate of the oxidant and a fuel flow rate of the fuel to maintain an efficacy of the catalyst bed based at least in part on the first differential temperature in order to maintain a target equivalence ratio;
   an oxidant injection system configured to inject a catalyst bed oxidant upstream of the catalyst bed, or an oxidant fuel injection system configured to inject an oxidation fuel upstream of the catalyst bed, or any combination thereof; and
   a localized differential temperature monitor configured to monitor a localized differential temperature between the first temperature of the portion of exhaust gas and a localized outlet temperature of the treated exhaust gas downstream of an injection point of the catalyst bed oxidant, oxidation fuel, or any combination thereof, wherein the oxidant-to-fuel ratio system is configured to adjust at least one of the oxidant flow rate, or the fuel flow rate, or any combination thereof, based at least in part on a comparison of the localized differential temperature with the first differential temperature.

2. The system of claim 1, wherein the first temperature is measured at an inlet of the catalyst bed and the second temperature is measured at an outlet of the catalyst bed.

3. The system of claim 1, comprising a plurality of catalyst beds, wherein the first temperature is measured at an inlet of one of the plurality of catalyst beds and the second temperature is measured at an outlet of one of the plurality of catalyst beds.

4. The system of claim 1, wherein the oxidant-to-fuel ratio system is configured to maintain the first differential temperature between approximately zero degrees Celsius to 400 degrees Celsius.

5. The system of claim 1, wherein the oxidant-to-fuel ratio system is configured to maintain the target equivalence ratio is between approximately 0.95 to 1.05.

6. The system of claim 1, comprising a heat recovery steam generator (HRSG) having the catalyst bed, wherein the HRSG is configured to generate steam using the portion of exhaust gas or the treated exhaust gas.

7. The system of claim 1, comprising a product conditioner having the catalyst bed, wherein the product conditioner is configured to treat the portion of exhaust gas.

8. The system of claim 7, wherein the product conditioner comprises a plurality of catalyst beds.

9. The system of claim 8, wherein the plurality of catalyst beds comprises a first catalyst bed disposed upstream of a second catalyst bed, wherein the system comprises an oxidant injection system configured to inject a catalyst bed oxidant downstream of the first catalyst bed, and wherein the first catalyst bed comprises a NOx catalyst configured to reduce a concentration of NOx in the portion of exhaust gas.

10. The system of claim 1, comprising a gas composition sensor disposed downstream of the catalyst bed, wherein the gas composition sensor is configured to sense a gas concentration of at least one of oxygen, carbon monoxide, hydrogen, nitrogen oxides, or unburned hydrocarbons, or any combination thereof, and wherein the oxidant injection system is configured to adjust a catalyst bed oxidant flow rate of the catalyst bed oxidant, or a catalyst bed fuel flow rate of the oxidation fuel, or any combination thereof, based at least in part on the gas concentration.

11. The system of claim 1, comprising an oxidant compressor configured to provide the oxidant to the gas turbine engine and the catalyst bed oxidant upstream of the catalyst bed.

12. The system of claim 1, comprising an oxidant-to-fuel sensor configured to sense an oxidant-to-fuel ratio of the exhaust gas, wherein the oxidant-to-fuel ratio system is configured to adjust at least one of the oxidant flow rate of the oxidant, or the fuel flow rate of the fuel, or any combination thereof, based at least in part on the oxidant-to-fuel ratio.

13. The system of claim 1, wherein the gas turbine engine is a stoichiometric exhaust gas recirculation (SEGR) gas turbine engine.

14. The system of claim 13, comprising an exhaust gas extraction system coupled to the gas turbine engine, and a hydrocarbon production system coupled to the exhaust gas extraction system.

15. A method, comprising:
   combusting an oxidant and a fuel in a gas turbine engine to generate an exhaust gas;
   treating a portion of the exhaust gas from the gas turbine engine in a catalyst bed to generate a treated exhaust gas;

monitoring a first differential temperature between a first temperature of the portion of the exhaust gas upstream of the catalyst bed and a second temperature of the treated exhaust gas downstream of the catalyst bed using a first differential temperature monitor;

adjusting a parameter to maintain an efficacy of the catalyst bed based at least in part on the first differential temperature in order to maintain a target equivalence ratio using an oxidant-to-fuel ratio system;

injecting a catalyst bed oxidant upstream of the catalyst bed using an oxidant injection system, or injecting an oxidation fuel upstream of the catalyst bed using an oxidation fuel injection system, or any combination thereof;

monitoring a localized differential temperature between an inlet temperature of the exhaust gas and a localized outlet temperature of the treated exhaust gas downstream of an injection point of the catalyst bed oxidant, the oxidation fuel, or any combination thereof, using a localized differential temperature monitor; and adjusting at least one of an oxidant flow rate of the oxidant, or a fuel flow rate of the fuel, or any combination thereof, based at least in part on a comparison of the localized differential temperature with the first differential temperature.

16. The method of claim 15, wherein the parameter comprises at least one of the oxidant flow rate of the oxidant, the fuel flow rate of the fuel, an exhaust gas flow rate of the portion of exhaust gas, a recycle flow rate of exhaust gas recycled to the gas turbine engine, a temperature of the catalyst bed, a pressure of the catalyst bed, or a diluent flow rate of diluent to the catalyst bed, or any combination thereof.

17. The method of claim 16, comprising at least one of adjusting the oxidant flow rate using an oxidant compressor, adjusting the oxidant flow rate by adjusting a speed of the oxidant compressor, adjusting the oxidant flow rate using an inlet guide vane of the oxidant compressor, adjusting the oxidant flow rate using an inlet control valve of the oxidant compressor, adjusting the oxidant flow rate using an outlet control valve of the oxidant compressor, adjusting a recycle of oxidant from the oxidant compressor, or adjusting a blow-off of oxidant from the oxidant compressor, or any combination thereof.

18. A system, comprising: a controller, comprising:
one or more tangible, non-transitory, machine-readable media collectively storing one or more sets of instructions; and
one or more processing devices configured to execute the one or more sets of instructions to:
combust an oxidant and a fuel in a gas turbine engine to generate an exhaust gas;
treat a portion of the exhaust gas from the gas turbine engine in a catalyst bed to generate a treated exhaust gas;
monitor a first differential temperature between an inlet temperature of the exhaust gas upstream of the catalyst bed and an outlet temperature of the treated exhaust gas downstream of the catalyst bed using a first differential temperature monitor;
transmit a first differential temperature signal from the first differential temperature monitor to a control system;
adjust a parameter to maintain an efficacy of the catalyst bed based at least in part on the first differential temperature in order to maintain a target equivalence ratio;
monitor a localized differential temperature between a first temperature of the portion of exhaust gas and a localized outlet temperature of the treated exhaust gas downstream of an injection point, wherein the injection point is configured to inject a catalyst bed oxidant, or an oxidation fuel, or any combination thereof, upstream of the catalyst bed; and
adjust at least one of an oxidant flow rate of the oxidant, or a fuel flow rate of the fuel, or any combination thereof, based at least in part on a comparison of the localized differential temperature with the first differential temperature.

19. The system of claim 18, wherein the one or more processing devices are configured to execute the one or more sets of instructions to increase the oxidant flow rate, decrease the fuel flow rate, or any combination thereof, when the localized temperature differential is greater than the first differential temperature, and to decrease the oxidant flow rate, increase the fuel flow rate, or any combination thereof, when the first differential temperature is greater than the localized temperature differential.

* * * * *